INVENTOR
NORBERT HOLM
BY
Fetherstonhaugh & Co.
ATTORNEYS

INVENTOR
NORBERT HOLM
BY
Fetherstonhaugh & Co.
ATTORNEYS

INVENTOR
NORBERT HOLM
BY
Fetherstonhaugh & Co.
ATTORNEYS

INVENTOR
NORBERT HOLM
BY
Fetherstonhaugh & Co.
ATTORNEYS

INVENTOR
NORBERT HOLM
BY
Fetherstonhaugh & Co.
ATTORNEYS

INVENTOR
NORBERT HOLM
BY
Fetherstonhaugh & Co.
ATTORNEYS 3,532,820

SELECTIVE INTERCOM SYSTEMS FOR APARTMENT BUILDING DOOR ANSWERING AND THE LIKE

Norbert Holm, West Vancouver, British Columbia, Canada, assignor to Noresco Manufacturing Co., Ltd., Vancouver, British Columbia, Canada Continuation-in-part of application Ser. No. 455,758, May 14, 1965. This application May 10, 1967, Ser. No. 643,003
Int. Cl. H04m 9/06
U.S. Cl. 179—1 19 Claims

ABSTRACT OF THE DISCLOSURE

Intercom systems particularly for apartment buildings employing a matrix system having a telephone at each junction, this being in an apartment or suite. The system includes, one or more door stations allowing a visitor to select and call a suite, carry on a two-way private conversation with the tenant, and allows the tenant to activate a remote door release.

CROSS-REFERENCE TO RELATED APPLICATION

This application is a continuation-in-part of application Ser. No. 455,758, filed May 14, 1965 now abandoned.

BACKGROUND OF THE INVENTION

This invention relates to intercom systems, and particularly to intercom systems for apartment buildings.

The apartment intercom systems which are now commonly in use include in the lobby of the apartment a button for each suite telephone, and all the telephones are connected in a common system so that any conversation between a person in the lobby and in a suite can be listened to by means of any other telephone in the system. As very large apartment buildings are now being built, the old system in common use is inadequate. If you want to call a person from the lobby but do not know the number of the suite, you have to look for the name of the person opposite the many call buttons in the lobby. The buttons can be arranged in numerical order, but not in alphabetical order. Even if an index with the names in alphabetical order is provided, you still have to find the button with the right number amongst the many others, and nowadays it is not unusual to have buildings with suites in the hundreds. There is also the difficulty of keeping the alphabetical index up to date with people constantly moving into and out of apartments or suites. Cost and lobby space is another difficulty with the prior systems. If there are hundreds of suites, you have to provide panels having the hundreds of call buttons. Furthermore, you need individual selection wires extending to the hundreds of telephones.

SUMMARY OF THE INVENTION

An intercom system in accordance with the present invention includes a first intercom unit, a plurality of second intercom units, and a selection means for connecting the first unit in series with a selected one of said plurality of second units and with a D.C. power supply. In a preferred form of the invention, the power supply has a first and a second output terminal, and said second intercom units are connected in a matrix having a plurality of rows of wires and a plurality of pairs of column wires with each said second intercom units being connected between a row wire and a pair of column wires, and said selection means comprises switching means for connecting the first terminal of the power supply to one of the row wires and for connecting said first unit in series between one pair of the column wires and the second terminal of the power supply to thereby select one of said second intercom units.

The present system eliminates the necessity of the multitude of wires used in the prior apartment intercom systems by employing a matrix system having a telephone at each junction, each telephone being located in an apartment or suite. Three single-pole selector switches are used. The operation of one switch selects the floor on which the telephone is located, and the operation of the other two switches (preferably ganged) selects the telephone on that particular floor. The simplicity of this system will be apparent when it is realized that for an apartment building with 23 floors and 23 suites on each floor, you would require only 23 horizontal lines, one for each floor, and 46 vertical lines, two for each vertical column of suites. The shunting action inherent in this matrix configuration has been greatly reduced, in one embodiment, by the introduction of a diode at each junction or telephone and entirely eliminated in another embodiment by the use of two diodes at each junction or telephone. Furthermore, with the present system, a single call switch in the lobby can be used for calling any selected telephone in the system without the necessity of additional wires, and a latch release at the main entrance door can be operated from any suite, also without any additional wires.

Some of the advantages of the present system are:

(a) Although comparatively few wires are used, the intercom system is selective.

(b) Any desired suite can be rung from the lobby, although only one button is provided for this purpose.

(c) A two-way conversation can be carried on between the lobby and any selected suite, and, in the embodiment using two diodes per junction, no one in any other suite can interfere.

(d) The door opener or unlatching device can be operated only from a suite that has been called from the lobby. This prevents the door from being unlatched by children, and the constant operation of the unlatching mechanism by children, which often causes an annoyance in the prior systems to people living in suites near the door since the unlatching mechanism usually includes an audible signal.

(e) One standard sized panel can accommodate up to 529 suites by the use of one single and one double conventional 23-position switch. The capacity can be increased merely by using switches with more contacts or using additional selector switches.

(f) This apparatus includes a very simple dial system which lends itself to easy maintenance of a directory with names in alphabetical order.

The wiring in the present intercom system is very much simpler than in any of the systems in common use. You require two communication lines to each vertical column of telephones, forming two parallel talk-listen circuits, and one common line for all the telephones on each floor, this line being common to the two talk-listen circuits of each telephone on the floor. The single call button in the lobby is connected through these lines to any selected telephone in the building. When each suite is selected and called, a release button in that suite is electrically connected to the door unlatching or opening mechanism so that the latter can be operated at this time to permit a person in the lobby to open the door.

DESCRIPTION OF THE PREFERRED EMBODIMENTS

In this disclosure and claims, the terms "intercom unit" or "intercom system" is used to denote an intercommunication unit or an intercommunication system, respectively.

Figure 1:
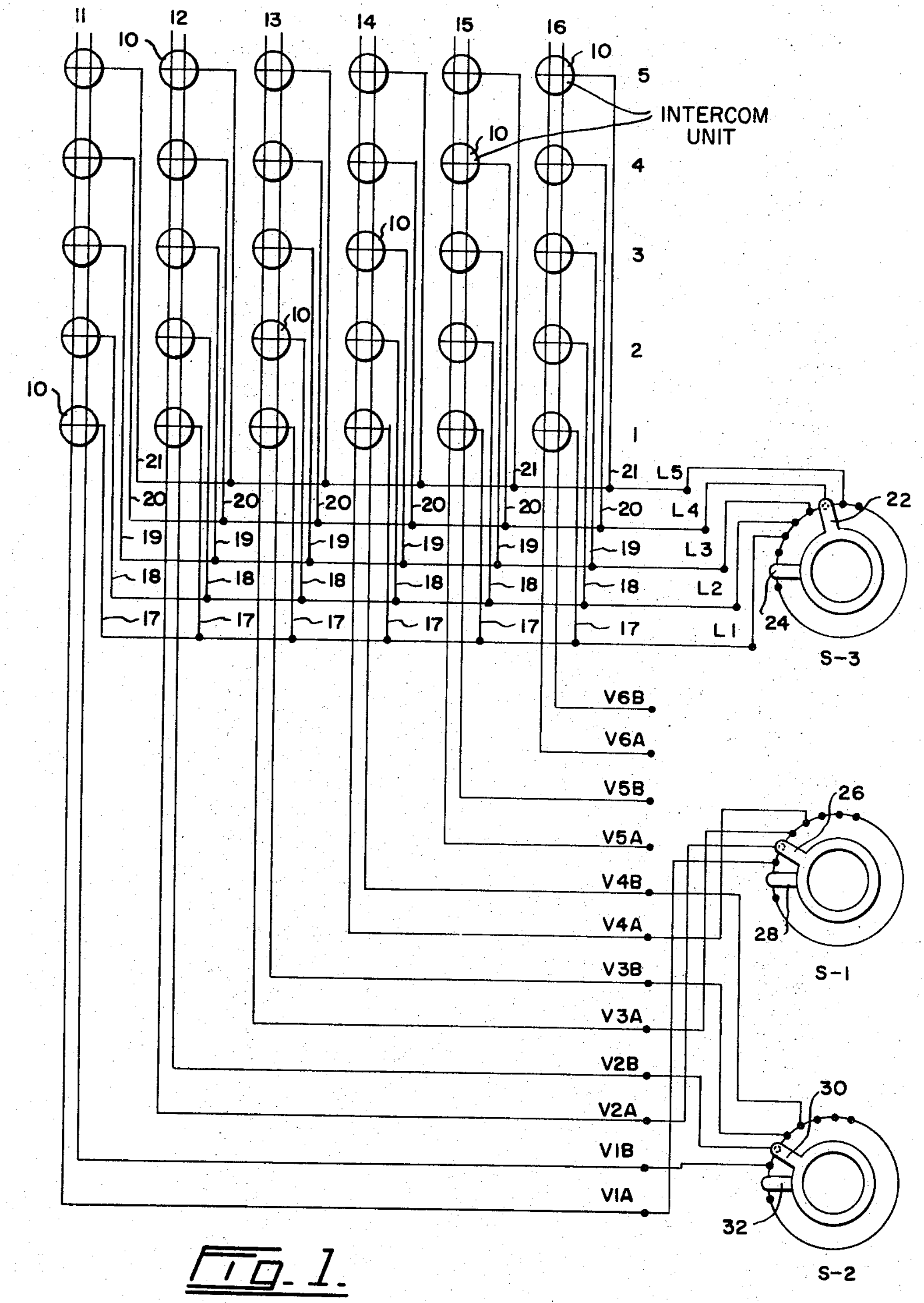
FIG. 1 is a schematic diagram showing the matrix arrangement of apartment intercommunication units and the selection switches therefor.

Referring to FIG. 1, there is schematically illustrated a matrix arrangement of intercom units 10 arranged in rows 1 to 5 and columns 11 to 16. The rows 1 to 5 corresponds to five floors of an apartment building and the columns 11 to 16 may correspond to six "columns" of apartments within the building, it being assumed for the purposes of illustration that each floor has the same number of apartments.

The apartment intercom units 10 on floor 1 are individually connected to line L1 by lines 17. Similarly, intercom units on floors 2 to 5 are individually connected to lines L2 to L5 respectively by lines 18 to 21 respectively. Lines L1 to L5 are connected to a rotary selection switch S–3 having a movable contact 22 by means of which any one of lines L1 to L5 may be connected to terminal 24 for a purpose which will be explained in connection with FIG. 3.

Each apartment intercom unit 10 in column 11 has a buzzer and earphone connected in series between a line V1A and the cathode of a diode having its anode connected to one of lines L1 to L5. Also, each apartment intercom unit in column 11 has a microphone connected to a line V1B and to the cathode of the aforementioned diode. Similarly, the intercom units in column 12 to 16 contain a buzzer and earphone connected in series between lines V2A to V6A respectively and the cathode of a diode having its anode connected to one of lines L1 to L5. Further, the intercom units in columns 12 to 16 have a microphone connected to lines V2B to V6B respectively and to the cathode of the aforementioned diode.

Lines V1A to V6A are connected to a rotary selection switch S–1 having a movable contact 26 by means of which any one of lines V1A to V6A may be connected to a microphone at the entrance of the apartment building via a stationary contact 28 as will be further explained in connection with FIG. 3. Similarly, lines V1B to V6B are connected to a rotary selection switch S–2 by means of which any one of lines V1B to V6B may be connected via a stationary contact 32 to the input of an amplifier feeding a loudspeaker at the entrance of the apartment building as will be further explained in connection with FIG. 3.

The selection switches S–1 to S–3 provide means for connecting an intercom unit in any one apartment to an intercom unit at for example, the front door of the apartmet building. Switch S–3 is used for lateral selection, i.e. to select a floor whereas switches S–1 and S–2, which are preferably ganged, are used for vertical selections, i.e. to select a column of apartment intercoms. With switches S–1 to S–3 set as shown in FIG. 1, the intercom at the junction of row 4 and column 12 is selected.

Figure 3:
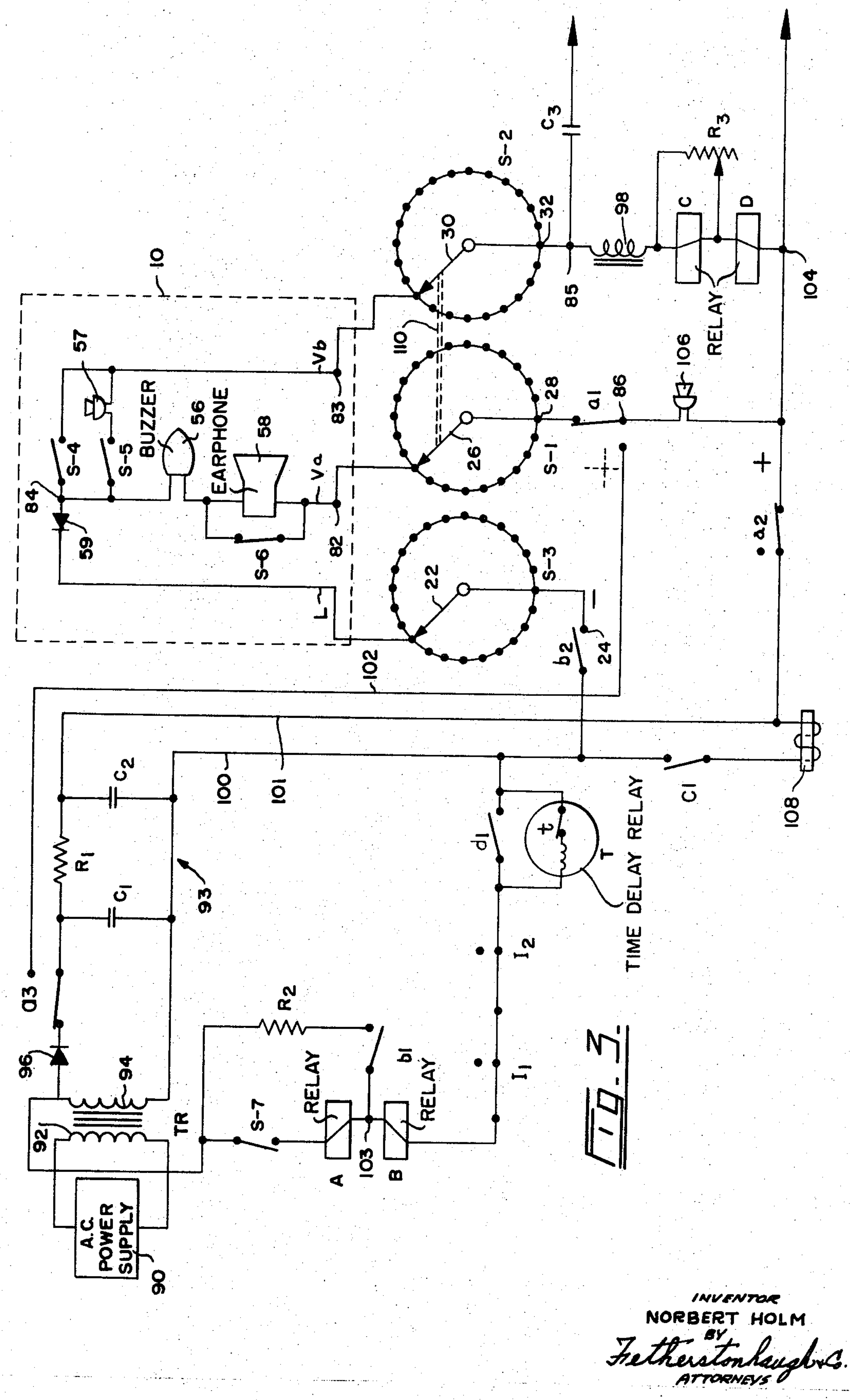
FIG. 3 is a schematic diagram of part of an apartment intercommunication system according to the invention and illustrating in detail an apartment intercommunication unit and control and signalling circuitry for connecting the apartment unit to an intercommunication unit at the door of the apartment building.

Referring to FIG. 3, each apartment intercom unit 10, of which only one is shown in FIG. 3, includes a diode 59 having its anode connected to line L and its cathode connected to one terminal of a buzzer or other signalling device 56, the other terminal of which is connected in series with an earphone or speaker 58 to line V*a*. Buzzer 56 is an AC type which permits an uninterrupted flow of direct current, and is activated by an alternating or pulsating direct current. The cathode of diode 59 is also connected through normally-open door unlatching switch S–4 to line V*b*, and through normally open microphone switch S–5 and microphone 57 to line V*b*. Earphone 58 is bypassed by a normally closed switch S–6. Switches S–5 and S–6 are opened and closed respectively, as shown in FIG. 3, when the apartment intercom hand unit, (not shown) is on its cradle (not shown) and move to the closed and opened positions respectively when the intercom hand unit is removed from its cradle. Line L corresponds to one of the lines L1 to L5 and lines V*a* and V*b* correspond to one of the pairs of lines V1A, V1B to V6A, V6B shown in FIG. 1.

The function of diode 59 in each of the intercom units is to eliminate any shunting currents in the matrix. This can be understood from a consideration of FIG. 2 which illustrates a simplified form of matrix having vertical lines 33 to 36 and horizontal lines W to Z. Each vertical line 33 to 36 is connected to each horizontal line by diode-load combinations 40–60 to 55–75. Each of the loads 60 to 75 can be signal device 56, microphone 57 and/or earphone or speaker 58. Assuming for purposes of illustration, that it is desired to pass current through load 65, then a positive voltage is applied to horizontal line X and a negative voltage to vertical line 34 which then biases diode 45 in the forward direction and allows direct current to pass through load 65 along the path 80. Shunting current cannot flow along path 81, for example, because of the blocking action of diode 51. Thus current passes through load 65 and diode 45 only. A pulsating signal current applied to the system will follow the same path.

Figure 2:
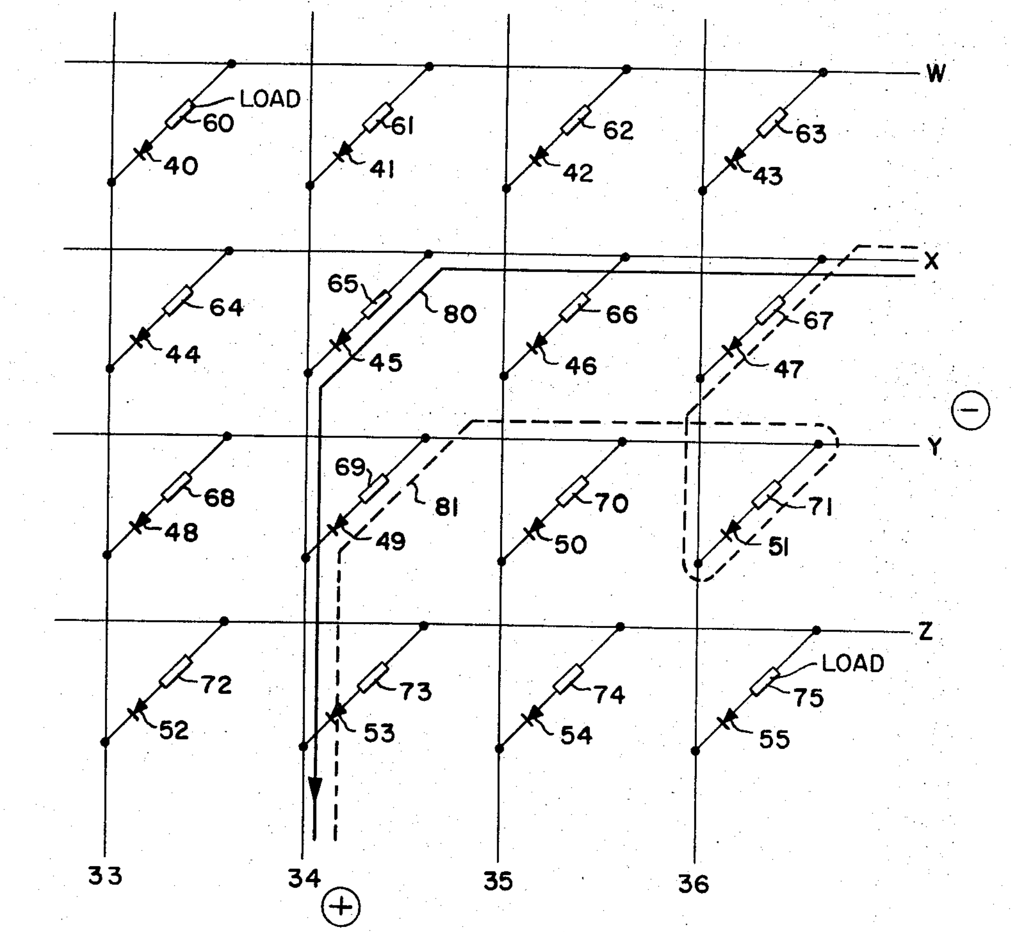
FIG. 2 is a simplification of a diode matrix useful in explaining the function of the matrix arrangement of in-intercommunication units according to the invention.

In the matrix arrangement shown in FIG. 1, each of the intercom units 10 includes a diode 59 (FIG. 3) for eliminating shunting currents in the same manner as diodes 40 to 55 in the matrix of FIG. 2. However, as will be explained in connection with FIG. 4, it is still possible for a nonselected intercom unit in the same column as a selected unit to listen in to the first intercom unit at the entrance of the apartment building; the arrangement of FIG. 5 eliminates even this possibility as will be explained in connection with FIG. 5.

Referring again to FIG. 3, the intercom system is illustrated with one apartment intercom unit 10 having an input terminal 82, an output terminal 83 and a common terminal 84, and an apartment entrance intercom unit having an input terminal 85, an output terminal 86 and a common terminal 104.

The intercom system according to the invention may be powered by an AC power supply 90 connected to the primary winding 92 of a transformer TR. The output of the secondary winding 94 of transformer TR is rectified by diode 96 and smoothed by a filter generally indicated at 93 and comprising resistor R1 and capacitors C1 and C2.

The negative side of the filter 93 is connected by line 100 through relay contacts *b*2 to the stationary contact 24 of selector switch S–3 and through interrupter contacts 11 and 12, relay contacts *d*1 which are shunted by a conventional thermal time delay relay T having normally closed contacts *t*, relay windings A and B and switch S–7 to the cathode of diode 96. The junction 103 of relay windings A and B is connected through relay contacts *b*1 and resistor R2 to the cathode of diode 96.

The positive side of the filter 93 is connected by line 101 through relay contacts *a*2 to terminal 104. Terminal 104 is connected through microphone 106 and relay contacts *a*1 to stationary contact 28 of selector switch S–1 and through relay coil D, variable resistor R3 shunting relay winding C, and choke coil 98 to the stationary contact 32 of selector switch S–2. R3 is provided for the purpose of adjusting the operating current of relay C. Microphone 106 is provided at the entrance of the apartment building. Contact 32 is coupled through capacitor C3 to one input terminal of an amplifier for feeding a speaker (not shown) at the entrance of the apartment building. The other input terminal of the amplifier is connected to terminal 104. Choke 98 is provided for separation of audio (plusating voice current) from direct current between points 85 and 104.

Upon energization of relay A by momentarily closing call switch S–7, the cathode of diode 96 is connected through relay contacts *a*3 and *a*1 to the stationary contact 28 of selector switch S–1.

The negative output terminal of the filter 93 is connected through line 100, relay contact *b*2 to the stationary contact 24 of selector switch S–3.

As explained in connection with FIG. 1, the selection switches S–1 to S–3 are used to select a particular apartment intercom unit and aresuitably mounted in a panel at the entrance of the apartment building. The two selector switches S–1 and S–2 are preferably ganged as indicated by dashed lines 110 in FIG. 3 and are connected to a drum type dial for indicating the apartment numbers. A disc mounted coaxially with the drum and protruding slightly out of the panel is used to rotate the selector switch and its associated dial to select a particular apartment number (column). Selector switch S–3 is used to select a floor (row) and is also provided with a drum type dial and actuating disc.

Upon selection of an apartment by means of the two dials, call button S–7 is depressed thereby energizing relays A and B and switching over contacts *a*1, *a*2, *a*3 and *b*1 and *b*2. Pulsating direct current from the cathode of diode 96 passes through contacts *a*3, line 102, contacts *a*1, selector switch S–1, line V*a*, switch S–6, in parallel with earphone 58, buzzer 56, diode 59, switch S–3, contacts *b*2 and line 100 back to the negative side of the filter 93. The closing of contacts *b*1 causes relay B to "hold," after call button S–7 is released, by allowing current to flow from the junction of the cathode of diode 96 with one end of the secondary winding 94 of transformer TR through resistor R2, contacts *b*1, relay winding B, interrupter contacts I1 and I2, and line 100 back to the other end of the secondary winding 94 of transformer TR.

If no response is received from a selected apartment, the hold circuit which includes thermal relay T, is opened by contacts *t* after a predetermined time.

Relay contacts *a*1 to *a*3 revert to the positions shown in FIG. 3 upon release of call button switch S–7.

While the hand-unit of the apartment intercom is in its cradle, the earphone 58 is bypassed by switch S–6, but if the receiver should accidentally have been left off the hook, the buzzer 56 will still respond although at a lower level, and an audible signal will also be produced by the earphone 58, which is then not shorted by switch S–6.

Upon removal of the hand unit from its cradle at the called station, switch S–5 closes and switch S–6 opens. At this time, the current flowing through microphone 57 energizes relay D to close contacts *d*1. A two-way conversation can then take place with the line L acting as common for the two voice lines V*a* and V*b*, connecting the microphone 57 of the apartment station to the amplifier at the entrance station, and the microphone 106 at the entrance station, to the earphone 58 in the apartment station.

When switch C1 is closed by relay C, opener 108 is energized by the power supply 93. It is now possible to unlatch the door of the apartment building from the apartment by depressing the door opener switch S–4, which completes a circuit for relay winding C from line 104 through relay winding C, shunted by variable resistor R3, choke 98, selector switch S–2, line V*b*, switch S–4, diode 59, selector switch SX3, contacts *b*2 and line 100 to the negative side of the filter 93. Resistor R3 is adjusted by cause relay C to operate only when switch S–4 is closed, the microphone current not being sufficient to operate this relay. An alternative adjustment can be made for the hold position of relay C to cause fall off either immediately when switch S–4 is released, or when the microphone current through V*b* is cut off by the opening of S–5 on replacement of the handset on the cradle. Relay C closes its contacts *c*1 to energize door unlatching magnet 108. Relay C may also complete a circuit to energize a light or buzzer inside the panel at the apartment entrance to indicate that the door can now be opened. Switch contacts I1 and I2 are provided for the purpose of releasing relay B from the "hold" position whenever one of the two dials (connected to the selector switches S–1 and S–3) is turned. Each of the two dials may be provided with suitable means (not shown) for interrupting one of the switches I1 or I2 each time it is moved from one switch position to the other. These interrupter switches prevent annoying "clicks" from occurring in the apartment station which would otherwise occur each time the moving contacts of the switch selector switches move over the respective dial positions of said apartments.

When the hand-set is replaced after a conversation, relay D is deenergized opening contacts *d*1. However, thermal relay T continues to hold for a predetermined time, after which contacts *t* of the thermal relay opens, causing the holding circuit of relay B to open.

Simply by operating selector switches S–1, S–2 and S–3, you can select any telephone in the building. When common call switch S–7 is operated, buzzer 56 of the selected telephone is operated to attract attention to the fact that someone is at the door and wishes to speak to the occupant of the suite. When the hand unit is taken off the cradle, a two-way conversation can take place between the person in the lobby and the one in the suite. Whether or not the hand unit is off the cradle, switch S–4 can be closed to operate the door opener 108. The sounding of buzzer 56 is stopped as soon as call switch S–7 is released since solenoid A is deenergized at this time. The closing of switch S–4 will not operate opener 108 unless the suite in which said switch S–4 is located has been called, since the telephone in that suite is isolated by the circuits when the selector switches are set for some other suite. Furthermore, even if the selector switches remain set for a particular suite, switch S–4 is inoperative since contacts *b*2 are normally open, and are only closed when call switch S–7 is closed.

Figure 4:
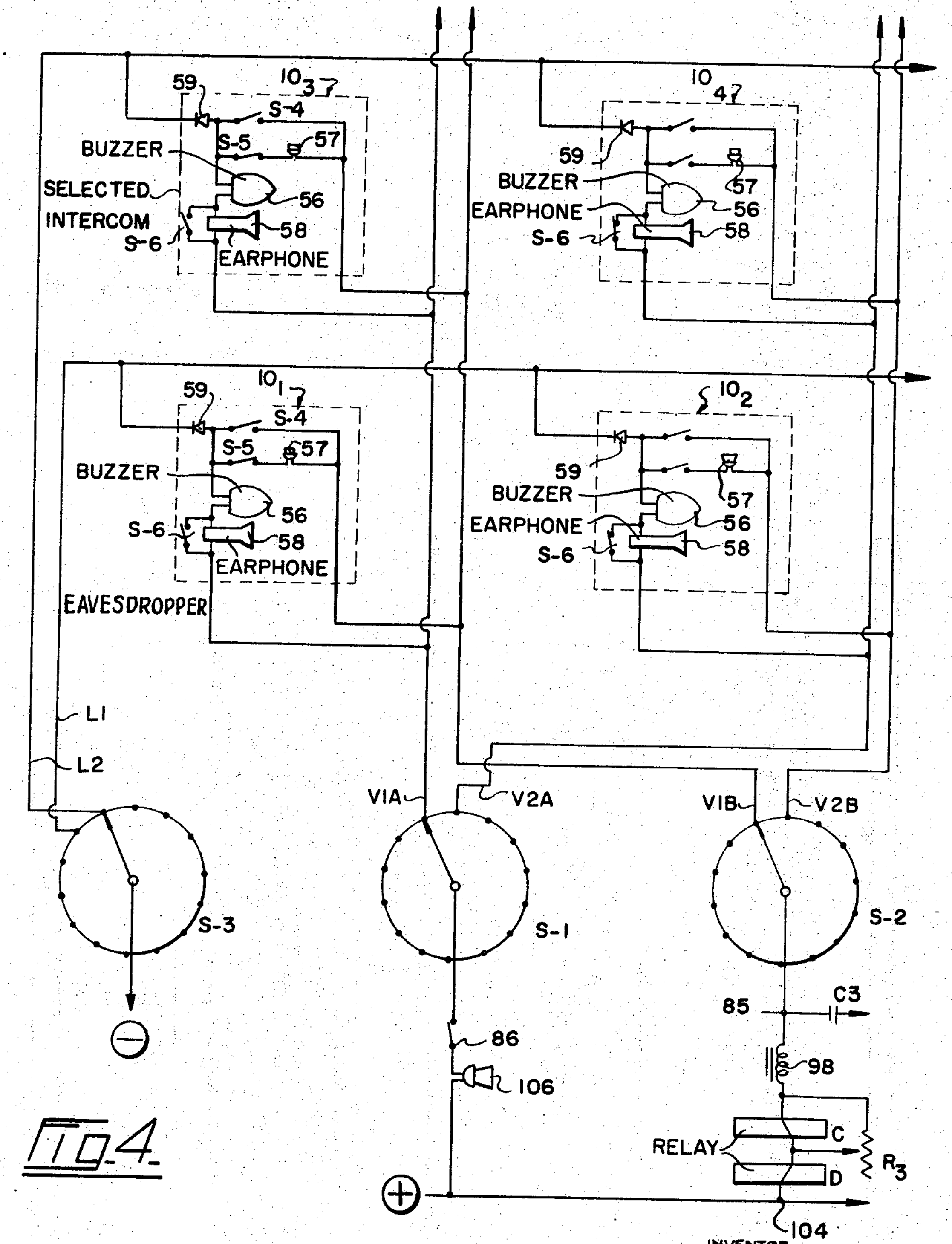
FIG. 4 is a schematic diagram of part of a matrix using apartment intercommunication units of the type shown in FIG. 3.

FIG. 4 illustrates a portion of a matrix of apartment intercom units of the type shown in FIG. 3. Four apartment units $\mathbf{10}_1$ to $\mathbf{10}_4$ are shown. It can readily be seen from the positions of selection switches S–1 to S–3 that apartment unit $\mathbf{10}_3$ has been selected. The power supply, relays A and B, etc. have not been shown in FIG. 4 although it will be appreciated that they are the same as in FIG. 3. Switches S–5 and S–6 have been shown in the closed and opened positions, respectively, for each units $\mathbf{10}_3$ and $\mathbf{10}_1$, i.e. the hand-units have been removed from their cradles in both cases. Apartment unit $\mathbf{10}_3$ can carry on a conversation with the unit at the apartment entrance; current flows from microphone 106 through selector switch S–1, line V1A, earphone or speaker 58, buzzer 56, diode 59, line $L_2$ and switch S–3 back to the negative side of the power supply. Similarly, microphone 57 in apartment unit $\mathbf{10}_3$ can communicate with the apartment unit in the entrance of the apartment building with current flowing from line 104 through relay D, resistor $R_3$ shunting relay C, chock 98, selector switch S–2, line V1B, microphone 57, switch S–5, diode 59, line L2 and selector switch S–3 to the negative side of the power supply.

It is further assumed that someone in apartment unit $\mathbf{10}_1$ has their hand-unit off the cradle and is attempting to eavesdrop or listen in to the conversation with apartment 10. Since the voltage at point 86 is higher than that at point 85 (due to voltage drop in the components between points 85 and 104), current from microphone 106 can flow through selector switch S–1, line V1A, earphone 58, buzzer 56, closed switch S–5 and microphone 57 (of unit $\mathbf{10_1}$), line V1B, selector switch S–2, choke 98, etc. to point 104 and the other side of microphone 106. Thus, someone in apartment $\mathbf{10_1}$ can listen to the conversation at the apartment entrance with selected apartment unit $\mathbf{10_3}$.

Apartment units 10 and $\mathbf{10_4}$ could, of course, not listen in since they are connected to non-selected contacts of selector switches S–1 and S–2 via lines V2A and V2B.

Figure 5:
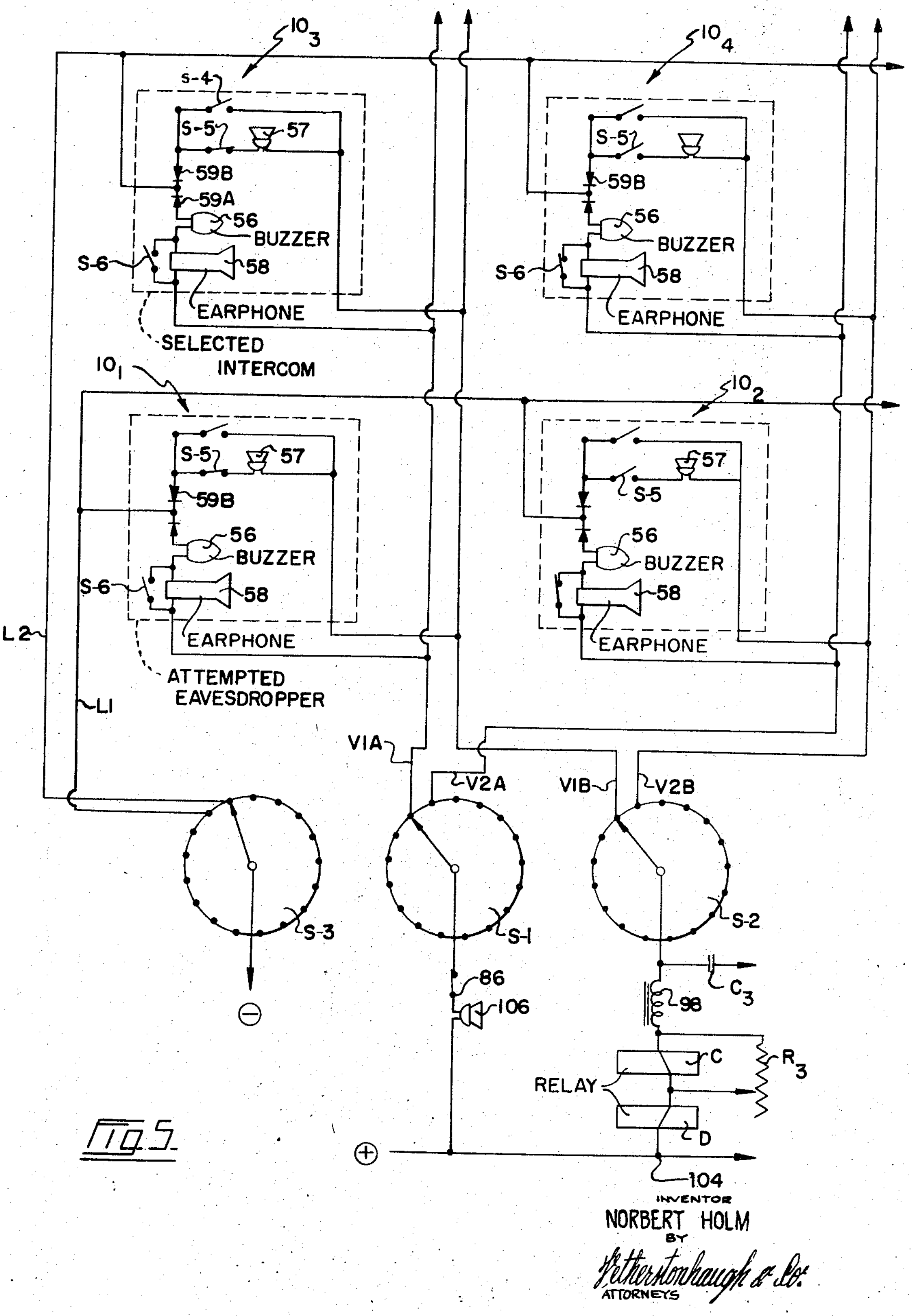
FIG. 5 is a schematic diagram of part of a matrix, similar to FIG. 4, but illustrating modified apartment intercommunication units.

The modified apartment intercom units shown in FIG. 5 eliminate the possibility of any eavesdropping. It is again assumed that apartment $\mathbf{10_3}$ is the selected unit and that apartment $\mathbf{10_1}$ is attempting to "eavesdrop." Hence switches S–5 and S–6 are closed and opened, respectively, in both of these units, i.e. the hand-units are removed from their cradles.

In selected apartment intercom unit $\mathbf{10_3}$, current from microphone 106 at the apartment entrance unit flows via selection switch S–1, line V1A through earphone 58, buzzer 56, diode 59A, line L2 and selection switch S–3 back to the negative side of the power supply. Similarly, current for microphone 57 in selected unit $\mathbf{10_3}$ flows from point 104 through relay D, resistor $R_3$ shunting relay C, choke 98, selector switch S–2, line V1B, through microphone 57, closed switch S–5, diode 59B, line L2 and selection switch S–3 back to the negative side of the power supply.

Looking at apartment unit $\mathbf{10_1}$, it can readily be seen that current from microphone 106 cannot flow through line V1A and apartment unit $\mathbf{10_1}$ to line V1B because of the blocking action of diode 59B. Thus, a completely private conversation is obtained between the apartment entrance unit and the selected apartment intercom unit, in this case, apartment unit $\mathbf{10_3}$.

Of course, as in the case of FIG. 4, apartment units $\mathbf{10_2}$ and $\mathbf{10_4}$ could not possibly eavesdrop because they are connected via lines V2A and V2B to non-selected contacts of selection switches S–1 and S–2.

Figure 6:
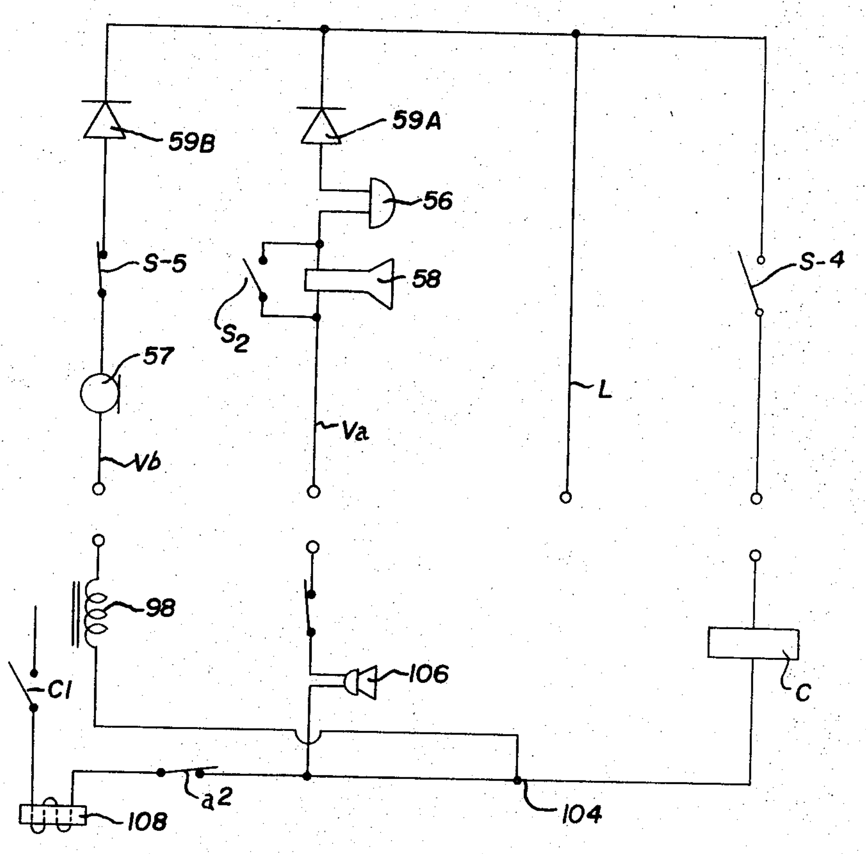
FIG. 6 is a schematic diagram illustrating a modification of the system of FIG. 5.

FIG. 6 illustrates a variation of the system of FIGS. 3, 4 and 5. Selection switches S–1 to S–3 are used in this system, but have been omitted from FIG. 6. Solenoids C and D and resistor $R_3$ are omitted and choke coil 98 is connected directly to terminal 104, as shown. In this alternative, the door unlatching switch S–4 of each intercom unit 10 is connected to solenoid D which, in turn, is connected to terminal 104. This arrangement eliminates the necessity for solenoid D and its associated elements.

Summing up, the basic idea of this invention employs the principle of a matrix for the purpose of private two-way communication between a selector switch-equipped matrix station, usually located at the door of an apartment building, and a selected one of a plurality of substations, usually located inside a suite of the building. Diodes used at the junction points of the matrix allow only one path of DC flow through the selected substation. This is used for , (a) 2-way voice communication modulating the intensity of DC current,
(b) operating a signal at the substation from the master station, and
(c) operating an electric release of the entrance door from this sub station.

What is claimed is:

1. An intercom system comprising a first intercom unit, a plurality of second intercom units, and selection means for connecting said first intercom unit in series with a selected one of said plurality of second intercom units and with a D.C. power supply, said power supply having a first and a second output terminal and said second intercom units being connected in a matrix having a plurality of row wires and a plurality of pairs of column wires forming junctions at said second intercom units there being no direct connection between said row wires and said pairs of column wires at said junctions, each of said second intercom units being connected to a row wire and to each of a pair of column wires, and said selection means comprising switching means for connecting said first terminal of said power supply to one of said row wires and for connecting said first unit in series between one pair of said column wires and said second terminal of said power supply to thereby select one of said second intercom units so as to establish voice and signal communication between the first intercom unit and said selected second intercom unit.

2. A system as claimed in claim 1 wherein each said second intercom unit includes diode means adapted to conduct curent from the pair of column wires to which it is connected to the row wire to which it is connected.

3. A system as claimed in claim 2 wherein each said diode means comprises a single diode, the diode of a selected second intercom unit being biased in the forward direction whereby current flows from the selected pair of column wires to the selected row wire.

4. A system as claimed in claim 2 wherein each said diode means comprises a pair of diodes, the diodes of a selected second intercom unit being biased in the forward direction whereby current flows through one diode to the selected row wire from one of the wires of the selected pairs of column wires and through the other diode to the selected row wire from the other wire of said selected pair of column wires.

5. A system as claimed in claim 4 wherein the pairs of diodes of nonselected second intercom units prevent shunting currents from flowing through said nonselected second intercom units.

6. A system as claimed in claim 2 wherein said first intercom unit and each said second intercom unit has an output terminal, an input terminal and a common terminal, the output terminal of said first unit being connected through said selection means and through one wire of one of said pairs of column wires to the input terminal of said selected second intercom unit, the input terminal of said first unit being connected through said selection means and through the other wire of said one of said pairs of column wires to the output terminal of said selected second unit, the common terminal of said first unit being connected to said second terminal of said power supply and the common terminal of said selected second unit being connected through said selection means to said first terminal of said power supply.

7. A system as claimed in claim 1 wherein said first intercom unit and each said second intercom unit has an output terminal, an input terminal and a common terminal, the output terminal of said first unit being connected through said selection means and through one wire of one of said pairs of column wires to the input terminal of said selected second intercom unit, the input terminal of said first unit being connected through said selection means and through the other wire of said one of said pairs of column wires to the output terminal of said selected second unit, the common terminal of said first unit being connected to said second terminal of said power supply and the common terminal of said selected second unit being connected through said selection means to said first terminal of said power supply.

8. A system as claimed in claim 7 wherein the output terminal of said first unit is connected through a first selection switch to the input terminal of said selected second unit, the input terminal of said first unit is connected through a second selection switch to the output terminal of said selected second unit and the common terminal of said selected second unit is connected through a third selection switch to said second terminal of said power supply.

9. A system as claimed in claim 8 wherein said first and second selection switches are ganged.

10. A system as claimed in claim 7 wherein each said second unit includes an earphone connected in series with a signalling device between said input terminal and said common terminal and said first intercom unit includes means adapted to cause said power supply to be connected to the input terminal and the common terminal of a selected second intercom unit to thereby energize the signalling device in said selected second unit.

11. A system as claimed in claim 10 wherein each said second unit includes a microphone connected in series with a normally-open switch between said output terminal and said common terminal and a normally-closed switch connected across said earphone.

12. A system as claimed in claim 10 wherein said each second unit includes a hand-unit and a cradle adapted to receive said hand-unit, said cradle holding said normally-open and said normally-closed switches open and closed respectively when said hand-unit is on said cradle and said normally open and normaly closed switches closing and opening respectively upon removal of said hand-unit from said cradle.

13. A system as claimed in claim 7 wherein said first unit is installed at the entrance of an apartment building, each said second unit is installed in a different apartment of said building and each said second unit contains means adapted to operate a door-unlatching device at said entrance, said means being operable by the selected second unit.

14. A system as claimed in claim 13 wherein said means adapted to operate said door-unlatching means comprises a second normally-open switch connected between the common terminal and the output terminal of each said second unit and the door-unlatching device comprises an electromagnet connected across said power supply through a set of normally-open relay contacts, said relay contacts being closed by energization of a relay winding connected between the output terminal and the common terminal of said first unit upon closure of said second normally-open switch.

15. A system as claimed in claim 13 wherein said means adapted to operate said door-unlatching means comprises a second normally-open switch connected to the common terminal of each said second unit, and the door-unlatching device comprises an electromagnet connected across said power supply through a set of normally-open relay contacts, said relay contacts being closed by energization of a relay winding connected between said electromagnet and said second normally-open switch.

16. A system as claimed in claim 3 wherein said first intercom unit and each said second intercom unit has an output terminal, an input terminal and a common terminal, the output terminal of said first unit being connected through said selection means and through one wire of one of said pairs of column wires to the input terminal of said selected second intercom unit, the input terminal of said first unit being connected through said selection means and through the other wire of said one of said pairs of column wires to the output terminal of said selected second unit, the common terminal of said first unit being connected to said second terminal of said power supply and the common terminal of said selected second unit being connected through said selection means to said first terminal of said power supply.

17. A system as claimed in claim 4 wherein said first intercom unit and each said second intercom unit has an output terminal, an input terminal and a common terminal, the output terminal of said first unit being connected through said selection means and through one wire of one of said pairs of column wires to the input terminal of said selected second intercom unit, the input terminal of the said first unit being connected through said selection means and through the other wire of said one of said pairs of column wires to the output terminal of said selected second unit, the common terminal of said first unit being connected to said second terminal of said power supply and the common terminal of said selected second unit being connected through said selection means to said first terminal of said power supply.

18. A system as claimed in claim 1 including means at each second intercom unit for permitting current to flow in one direction only between the row wire and the pair of column wires to which said each second unit is connected.

19. A system as claimed in claim 18 in which said means at each second intercom unit for permitting current flow comprises diode means.

References Cited

UNITED STATES PATENTS

| | | | |
|---|---|---|---|
| 2,515,883 | 7/1950 | Meade | 179—1 |
| 3,284,571 | 11/1966 | Wittig | 179—1 |
| 3,321,745 | 5/1967 | Mansuetto et al. | 340—166 |

KATHLEEN H. CLAFFY Primary Examiner

J. S. BLACK, Assistant Examiner

U.S. Cl. X.R.

179—37